Figure 1:
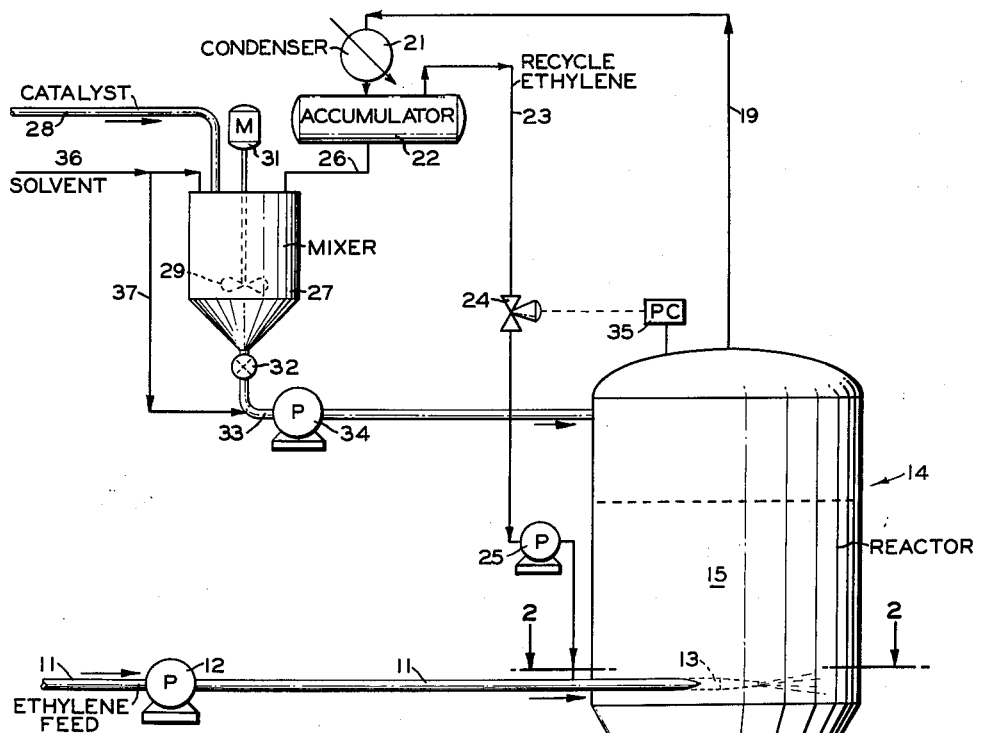

INVENTOR.
H. B. IRVIN

BY Hudson and Young

ATTORNEYS

United States Patent Office 3,008,938
Patented Nov. 14, 1961

3,008,938
MANUFACTURE OF HYDROCARBON
POLYMERS
Howard B. Irvin, Bartlesville, Okla., assignor to Phillips
Petroleum Company, a corporation of Delaware
Filed July 9, 1956, Ser. No. 596,565
20 Claims. (Cl. 260—88.2)

This invention relates to an improved method for the polymerization of unsaturated hydrocarbons and a novel apparatus for accomplishing the polymerization. In one of its aspects, this invention relates to improved means for the continuous polymerization of unsaturated hydrocarbons.

It has recently been discovered that 1-olefins having a maximum of 8 carbon atoms per molecule and no branching nearer the double bond than the 4-position can be polymerized to solid and semi-solid polymers at temperatures and pressures which are relatively low as compared with conventional processes for polymerizing such olefins. Such polymerization is generally carried out by first admixing and at least partially dissolving the olefins in a non-polymerizable solvent and by carrying out the polymerization in the presence of a catalyst.

In the copending application of Hogan and Banks, Serial No. 573,877, filed March 26, 1956, now Patent No. 2,825,721, issued March 4, 1958, a process is disclosed for producing polymers of 1-olefins by carrying out the polymerization at a temperature in the range of 100 to 500° F. in the presence of 0.1 to 10 or more weight percent of chromium oxide, preferably including a substantial proportion of hexavalent chromium associated with at least one porous oxide selected from the group consisting of silica, alumina, zirconia and thoria. A preferred catalyst is one comprising 0.1 to 10 or more weight percent chromium as chromium oxide supported upon a silica-alumina base such as 90 percent silica–10 percent alumina. The catalyst employed is usually a highly oxidized catalyst which has been activated by treatment at an elevated temperature under non-reducing conditions and preferably in an oxidizing atmosphere. Polymerization usually is carried out in the liquid phase such as in solution in a hydrocarbon solvent, especially a paraffin or a cycloparaffin which is liquid under the polymerization conditions; however, vapor phase operation or mixed phase operation can be effected. Diolefins such as 1,3-butadiene are within the scope of this invention since any olefinic material having olefinic linkage in the 1-position comes within the scope of the invention of the above-identified copending application.

It is an object of this invention to provide an improved method and means for the polymerization of monomers.

It is also an object of this invention to provide an improved process for the continuous polymerization of 1-olefins. It is also an object of this invention to provide a device for the continuous polymerization of 1-olefins. It is a further object of this invention to provide a process for the continuous polymerization of 1-olefins wherein the introduction of the 1-olefin feed accomplishes the mixing required for contacting the olefin with the catalyst. It is still another object of this invention to provide a system of polymerization of 1-olefins wherein the polymer produced and the unreacted olefins are continuously removed so as to provide a novel and continuous process. Other objects and advantages will be apparent to one skilled in the art upon study of this disclosure including the drawing wherein:

FIGURE 1 presents diagrammatically a preferred embodiment of the invention; and

Figure 2:
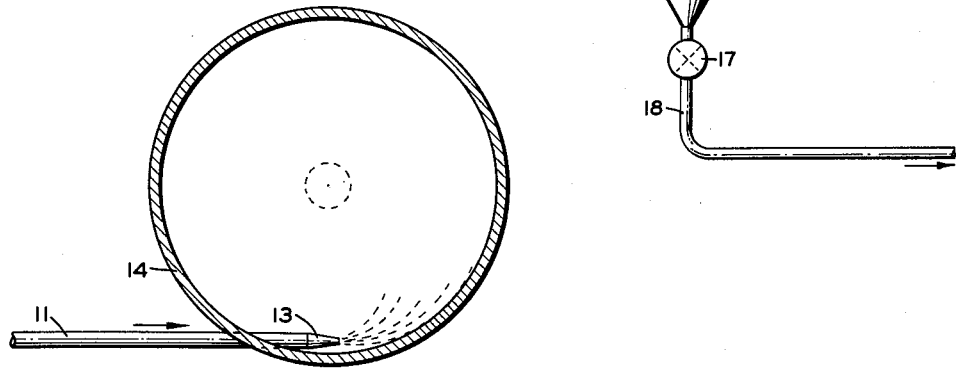

FIGURE 2 shows a sectional plan view of the polymerization reactor of this invention.

Broadly the invention contemplates the introduction of a monomer tangentially into a reaction zone containing a finely divided solid catalyst suspended in an inert solvent for the monomer so as to maintain a vortex of the solvent in the reaction zone. The vortex thus created and maintained tends to separate the polymer as a separate phase by centrifugal force so that its removal from the reaction zone is facilitated. Solvents normally utilized for the liquid phase or mixed phase polymerization of monomers can be utilized in the practice of this invention because such solvents will exert varying degrees of limited solubility for the polymer under polymerizing conditions of temperature and pressure. As soon as the solvent becomes saturated with polymer, additional polymer will be thrown out of solution at the rate at which it is formed. The solid catalyst employed is introduced as a finely divided suspension in the solvent and the spent catalyst is removed with the polymer produced, said polymer being substantially insoluble in and heavier than the solvent material due to the saturation of the solvent with polymer. Thus, the polymer and spent catalyst are continuously withdrawn from the lower portion of the polymerization zone. The heat of polymerization can be removed by the evaporation of the solvent and such evaporation can be controlled at a predetermined rate. In this mode of operation, the vaporized solvent and a considerable portion of vaporized and unreacted monomers are removed overhead from the vortex of reactants, the overhead stream is cooled so that the solvent is condensed and the remaining vaporized monomer is recycled to the reaction zone as feed to the polymerization reaction. The condensed solvent is returned to the reaction zone together with additional finely divided catalyst.

I have found that low boiling paraffinic and cycloparaffinic hydrocarbons are peculiarly adaptable as solvents for my improved process because these hydrocarbons are suitable solvents for normally gaseous 1-olefins, are substantially inert to the polymers produced, and display limited solubility for the polymers at the operating conditions employed.

While the normally gaseous olefins are ordinarily preferred as the feed material in my novel polymerization process, 1-olefins containing up to 8 carbon atoms per molecule can be utilized. It is preferred that the temperature and pressure relationship be maintained so that at least a portion of the olefin will be in the gaseous phase in the reactor. The solvent should be of higher molecular weight material than the olefin by at least 1 carbon atom and preferably by 2 or more carbon atoms. The reactor temperature and pressure relationship should be such that a considerable portion of the solvent is vaporized so that temperature can be controlled by withdrawal of solvent vapors.

In one embodiment of my improved process and apparatus for the polymerization of normally gaseous 1-olefins, a substantial amount of solvent is caused to evaporate from the polymerization zone so as to effect the removal of the heat of polymerization and to provide a recycle stream of unreacted 1-olefin sufficiently large to accomplish the amount of agitation within the polymerization reactor required to contact the 1-olefin with the catalyst and furthermore, to provide a sufficient amount of solvent continuously returned to the reactor to introduce a desired amount of fresh catalyst.

Solvents which can be employed include low boiling paraffinic and cycloparaffinic hydrocarbons such as cyclobutane, cyclopentane, cyclohexane, n-butane, n-pentane, n-hexane, isobutane, isopentane and isohexanes. Solvents must be inert with respect to the polymer and the 1-olefin and also non-poisons with respect to the catalyst. Thus, the solvents must be substantially free from water, oxygen, certain sulfur compounds such as hydrogen sulfide, halogens and other materials which act as poisons to the catalyst employed. Low molecular weight paraffins and cycloparaffins satisfy the above requirements since these materials are inert to the catalyst, to the 1-olefins and to the polymer.

The reactor preferably is operated at a temperature below the critical temperature of the solvent employed so that liquid phase operation is assured. This is desirable in order to facilitate suspending the catalyst in the solvent and to control the temperature of the reaction by vaporization of solvent. Thus, a solvent is selected which will be in the liquid phase under the operating conditions contemplated.

The 1-olefin polymers prepared according to the procedure of the copending Hogan and Banks application, Serial No. 573,877, filed March 26, 1956 are soluble in the above referred to solvents within certain temperature ranges. A solution of an above-described polymer in one of those solvents exhibits a cloud point upon cooling and the same solution upon being heated, instead of being cooled, exhibits a second cloud point at some higher temperature. A solution of polyethylene in a paraffinic or naphthenic hydrocarbon has an upper cloud point in the range of from about 300 to about 500° F. indicating formation of a second liquid phase rich in polymer.

The temperature of the upper cloud point or solubility inversion point will be dependent upon several variables including molecular weight of the polymer, molecular weight of the solvent and concentration of the polymer in the solvent. The phenomenon of solubility inversion of the 1-olefin polymers of the copending Hogan and Banks application is disclosed and described in the copending application of Hanson and Croley, Serial No. 510,199, filed May 23, 1955 now Patent No. 2837,504, issued June 3, 1958.

In one embodiment of this invention a 1-olefin, such as ethylene, is tangentially introduced into a vortex of solvent containing suspended solid catalyst at polymerizing conditions of temperature and pressure such that the solvent is predominately in the liquid phase and is maintained at the solubility inversion temperature of the solvent phase. The polymer separates from the solvent as it is formed and accumulates in the bottom of the reactor as a polymer rich phase where it is continuously drawn off. The solvent phase is saturated with polymer but the solubility of the polymer in the solvent phase is low since the temperature is at the solubility inversion point or upper cloud point and also because the 1-olefin is preferentially soluble in the solvent.

It is also possible to operate the system at the lower cloud point of the solvent phase so that the polymer precipitates from the solvent as a solid. In this modification of the invention, a low molecular weight solvent such as propane, butane or pentane is particularly desirable because of the high vapor pressure at the lower temperature, the increased solubility for the 1-olefin and the low solubility of polymer in the solvent. The polymer product is recovered as a slurry of polymer in solvent. The process can be advantageously utilized in the polymerization of ethylene in pentane solvent at a temperature in the range 200 to 230° F. and at a pressure sufficient to maintain the major portion of the solvent in liquid phase.

The polymer which is recovered at the upper cloud point or the lower cloud point will contain solid catalyst. The catalyst can be removed by supplying additional solvent and adjusting the temperature of the solvent and polymer so that the polymer is soluble in the solvent. The solid catalyst then can be removed from the resulting solution by filtration, centrifugation or other separation means.

Referring now to FIGURE 1, a 1-olefin feed stream, for example a stream of purified etylene is introduced through line 11 and pump 12 to feed injection nozzle 13 in reactor 14. One injection nozzle is illustrated, however, a plurality of nozzles can be employed. Reactor 14 is designed so as to have a reaction section 15 above the nozzle 13 containing the solid catalyst suspended in a solvent, for example n-hexane and a polymer collecting zone 16 below the nozzle 13. Polymer is removed from the bottom of reactor 14 through valve 17 and line 18. The feed injection nozzle 13 introduces the ethylene tangentially into reactor 14 so as to provide agitation in the liquid solvent and to assist in separation of the polymer from the solvent. The tangential position of the feed nozzle is shown in FIGURE 2. Vapors are removed from the top of reactor 14 through line 19, cooled in condenser 21 and passed to accumulator 22 where uncondensed vapors comprising unreacted 1-olefin are removed overhead through line 23 and returned through control valve 24 and pump 25 to line 11 so as to provide the olefin recycle stream. The liquid resulting from condensation of reactor overhead vapors is collected in accumulator 22 and is passed through line 26 to mixer 27 and admixed therein with finely divided fresh catalyst introduced to mixer 27 through line 28. Stirrer 29 actuated by motor 31 maintains the contents of mixer 27 agitated so as to maintain the catalyst in a state of suspension in the solvent liquid. The slurry of catalyst and solvent is removed from mixer 27 through valve 32 and passed via line 33 and pump 34 to the upper portion of reactor 14. The temperature in the reactor is a function of the pressure therein and is controlled by pressure controller 35 which controls valve 24 in response to the pressure within reactor 14.

The polymer removed through line 18 contains solid catalyst and this polymer can be passed to a purification means for removal of catalyst and further processing in means not shown. However, in many cases, the catalyst need not be removed. Make-up solvent can be added through lines 36 or 37.

It is to be understood that details such as valves and other items of conventional equipment are not shown in the drawing in order to facilitate illustration of the invention.

The following specific embodiment illustrates a preferred mode of operation of the invention but is not to be construed as limiting the invention.

Ethylene is introduced to reactor 14 through line 11 at about 300° F. and at a rate of 100 pounds per hour. Normal pentane is added to the reactor through line 37 at about 300° F. and a rate of 100 pounds per hour. Pressure is maintained in the reactor at about 500 p.s.i.a. Catalyst comprising 10 weight percent chromium as chromium oxide and 90 weight percent of a catalyst base comprising 90 weight percent silica and 10 weight percent alumina is added to mixer 27 as a slurry of powdered catalyst and normal pentane through line 28 at the rate of 3 pounds of catalyst per hour. A vaporized mixture of normal pentane and unreacted ethylene in the amount of about 260 pounds of normal pentane and 1740 pounds of ethylene is removed from the reactor per hour through line 19 and is cooled to about 100° F. in cooler 21 so that a liquid phase and a vapor phase are formed in accumulator 22. A vaporous recycle stream of 1680 pounds per hour comprising 1600 pounds of ethylene and 80 pounds of normal pentane is returned to the reactor through lines 23 and 11. A liquid stream of about 320 pounds per hour comprising 180 pounds of normal pentane and 140 pounds of ethylene is passed to mixer 27 and is returned to the reactor through line 33 along with the normal pentane passed through line 37.

A product stream of about 203 pounds per hour is removed from the bottom of the reactor at a temperature of 300° F. The product stream comprises about 60 pounds per hour of ethylene polymer having a molecular weight of about 43,000, about 100 pounds per hour of normal pentane, about 40 pounds per hour of ethylene and about 3 pounds per hour of catalyst.

The polymer is recovered from the product stream in a subsequent purification step which does not form a part of this invention. Purification methods include dissolving the polymer and removing the solid catalyst by filtration, centrifugation or other separation methods, after which the solvent is removed by a flashing step, by vacuum drying in combination with a kneading operation, or by other suitable means. One particularly desirable method for the separation of polymer from solvent is to disperse the hot polymer solution obtained as the product of polymerization in 1 to 5 volumes of cool water under conditions of temperature and pressure such that the solvent and water are maintained in liquid phase until the polymer is precipitated, after which the solvent can be flashed off and the polymer recovered. This method of polymer recovery is more fully described and is claimed in copending application Serial No. 584,812, filed June 14, 1956, by R. G. Wallace.

In the operation of the system of my invention, the 1-olefin is introduced into the reactor at substantially the temperature of the polymerization reaction. In the polymerization of ethylene wherein n-hexane is utilized as the solvent, the polymerization temperature will be in the range of about 300 to about 500° F. The ethylene is introduced at high velocity so as to establish a rotational movement to the body of liquid solvent in the reaction zone which assists in separating the heavier liquid polymer from the solvent and together with ebullition of the liquid solvent provides sufficient agitation in the liquid solvent to maintain the catalyst in suspension and to aid in contacting the ethylene with the catalyst particles.

The liquid polymer is removed from the bottom of the reactor, either intermittently or continuously, and is passed to further processing. The liquid polymer contains a minor amount of solvent since there is limited mutual solubility at the operating temperatures but this does not detract from the process because the solvent can easily be removed from the polymer.

Solvent and unreacted ethylene vapors are removed from the reactor and are cooled sufficiently to condense a portion of the n-hexane solvent. The liquid n-hexane is passed to a mixing vessel where there is added the amount of solid catalyst required to maintain the polymerization at the desired rate. Additional solvent is added at this point as needed and the body of solvent and catalyst is maintained in a state of agitation sufficient to maintain the catalyst in suspension. This slurry of catalyst and solvent is added to the reactor intermittently or continuously as needed.

The unreacted olefin which remains in the vapor phase following condensation and removal of the solvent is recycled to the reactor feed nozzle at a controlled rate. This recycle stream is controlled advantageously by a valve in the recycle line which is actuated by a pressure controller which is sensitive to the reactor pressure. This recycle stream valve can also be controlled by a temperature controller sensitive to the reactor temperature, if desired. In either case, the olefin recycle is regulated so as to control the reactor temperature within the desired limits.

A particular feature of one embodiment of the invention lies in the step of introducing the olefin feed at a point vertically intermediate the polymer collecting zone in the lower portion of the reactor and the reaction zone in the upper portion of the reactor wherein the solvent containing dissolved olefin is caused to be initimately contacted with the finely divided catalyst which is maintained in a suspended state by the continuous agitation resulting from introduction of the olefin feed. A plurality of feed inlets can be vertically or horizontally spaced in the reactor section if desired and furthermore mechanical agitators such as propellers can be positioned in the reactor section if additional agitation is desired. The solvent in the reactor which is saturated with the 1-olefin tends to travel upwardly through the reaction zone whereas the polymer formed tends to travel downwardly to the polymer collection zone being displaced from solution by the more soluble 1-olefin and continuous formation of additional polymer. The catalyst which is carried down with the polymer and has been referred to above as spent catalyst is considered spent only in that its activity has been reduced somewhat over that of the fresh catalyst introduced into the reactor. This catalyst can be recovered from the polymer and returned to the reactor since it is still considered to be sufficiently active to catalyze the polymerization reaction, however, the catalyst is usually discarded because it is presently more economical to supply fresh catalyst than to recover and recycle partially spent catalyst.

The temperature of the reaction is maintained at the desired level by controlling the rate of evaporation of olefin saturated solvent. The temperature in the reactor is a function of the pressure therein and therefore, control of vapor removal in accordance with the pressure within the reactor is an accurate and convenient means for controlling the reactor temperature. This step of controlling reactor temperature by controlling the amount of recycle olefin is also a feature of this invention.

It is preferred that a solvent be selected for the polymerization reaction which will be vaporized at the reaction conditions of temperature and pressure to provide the cooling required to control the reactor temperature. It is possible, however, to operate the process of this invention in the liquid phase by providing a quiescent liquid zone above the reaction zone which is maintained in a state of agitation. In the quiescent zone, the catalyst will settle out so that a liquid mixture of unreacted monomer and solvent can be withdrawn, cooled and returned to the reactor to control reactor temperature. Catalyst should be removed from a liquid stream taken from the reactor for cooling and returning to the reactor so as to avoid fouling external lines and equipment with polymer.

Reasonable variations and modifications are possible within the scope of the present invention, the essence of which is the steps of introducing a 1-olefin into a vortex of finely divided catalyst suspended in a solvent at polymerizing conditions and at a temperature at which the solvent exerts limited solubility for the polymer; and means for accomplishing said steps.

That which is claimed is:

1. A process for polymerizing at least one olefin having from 1 to 8 carbon atoms per molecule to produce a normally solid polymer which comprises introducing said olefin tangentially into a reaction zone containing a body of a liquid hydrocarbon solvent which has limited solubility for the polymer under the conditions of polymerization so as to form a vortex of said liquid hydrocarbon solvent in said reaction zone, said solvent containing dispersed therein a finely divided, solid catalyst comprising a minor proportion of chromium in the form of chromium oxide, and containing a substantial amount of hexavalent chromium, associated with at least one finely divided oxide selected from the group consisting of silica, alumina, zirconia and thoria, at substantially the solubility inversion temperature of the polymer in said solvent and in the range 300 to 500° F., and a pressure sufficient to maintain said mixture substantially in the liquid phase, polymerizing at least a portion of said olefin in said reaction zone, removing vaporized solvent and olefin from said reaction zone, at a rate sufficient to maintain the reaction at substantially the solubility inversion temperature condensing vaporized solvent and returning same to said reaction zone, returning vaporized olefin to said reaction zone, and removing polymer which has been thrown out of solution from said reaction zone at a point below the introduction of said olefin.

2. The process of claim 1 wherein the olefin is ethylene.

3. The process of claim 1 wherein the olefin is propylene.

4. The process of claim 1 wherein the olefin is a mixture of ethylene and propylene.

5. The process of claim 1 wherein the olefin is 1-butene.

6. The process of claim 1 wherein the hydrocarbon solvent is at least one hydrocarbon selected from the group consisting of paraffins and naphthenes.

7. The process of claim 1 wherein the hydrocarbon solvent is n-hexane.

8. The process of claim 1 wherein the hydrocarbon solvent is n-butane.

9. The process of claim 1 wherein the hydrocarbon solvent is a mixture of isooctanes.

10. The process of claim 1 wherein the hydrocarbon solvent is n-pentane.

11. The process of claim 1 wherein the hydrocarbon solvent is cyclohexane.

12. In the process for polymerizing ethylene in a liquid hydrocarbon solvent to produce normally solid polyethylene the improvement comprising introducing the ethylene tangentially into a body of said liquid hydrocarbon solvent in a reaction zone at the solubility inversion temperature of the solution of polymer in the liquid solvent phase, recovering from a point below the point of introduction of said ethylene, said polymer which has been thrown out of solution and removing vaporized hydrocarbon and unreacted ethylene at a rate sufficient to maintain the reaction at the solubility inversion temperature.

13. The process for polymerizing a 1-olefin with a solid catalyst to produce a normally solid polymer which comprises tangentially introducing said 1-olefin into a reaction zone so as to form a vortex of an inert solvent containing a finely divided solid catalyst suspended therein under polymerizing conditions of temperature and pressure at which the solvent exerts limited solubility for the polymer produced; removing sufficient vaporized material from the upper portion of said vortex to control the polymerizing temperature; and removing polymer which has been thrown out of solution from the lower portion of said vortex.

14. The process of claim 13 wherein the polymerizing temperature is the upper cloud point temperature of the solution of polymer in the liquid solvent.

15. The process of claim 13 wherein the polymerizing temperature is the lower cloud point temperature of the solution of polymer in the liquid solvent.

16. The process for polymerizing a 1-olefin to produce a normally solid polymer which comprises introducing said 1-olefin tangentially into a reaction zone into a body of an inert liquid hydrocarbon solvent which has limited solubility for the polymer under the conditions of polymerization containing a finely divided solid catalyst suspended therein, so as to form a vortex in said inert liquid solvent, maintaining a temperature at which the polymer is only partially soluble in the solvent, and removing from a point below the point of introduction of 1-olefin polymer which has been thrown out of solution from the reaction mixture by virtue of the centrifugal force created by the vortex.

17. A process for polymerizing ethylene to normally solid polyethylene which comprises introducing said ethylene tangentially into a body of liquid hydrocarbon solvent which has limited solubility for the polymer under the conditions of polymerization in a reaction zone containing a suspension therein of a minor proportion of a finely divided catalyst comprising a minor proportion of chromium as chromium oxide, and containing a substantial amount of hexavalent chromium, associated with at least one finely divided oxide selected from the group consisting of silica, alumina, zirconia and thoria, at a temperature in the range 200 to 230° F., and a pressure sufficient to maintain said hydrocarbon solvent substantially in the liquid phase so as to form a vortex in said liquid hydrocarbon solvent; polymerizing at least a portion of said ethylene in said reaction zone; removing vaporized hydrocarbon solvent and unreacted ethylene from said reaction zone at a rate sufficient to maintain the reaction zone in the range 200 to 230° F.; condensing a portion of vaporized hydrocarbon solvent and returning same to said reaction zone; returning vaporized ethylene to said reaction zone; and removing polymer from said reaction zone from a point below the point of introduction of ethylene.

18. The process of claim 17 wherein the hydrocarbon solvent is cyclohexane.

19. The process of claim 17 wherein the hydrocarbon solvent is n-butane.

20. The process of claim 17 wherein the hydrocarbon solvent is n-pentane.

References Cited in the file of this patent

UNITED STATES PATENTS

| | | |
|---|---|---|
| 2,146,667 | Atwell | Feb. 7, 1939 |
| 2,289,329 | Prickett | July 7, 1942 |
| 2,332,276 | Stahly | Oct. 19, 1943 |
| 2,374,518 | Wolk et al. | Apr. 24, 1945 |
| 2,438,728 | Tyson | Mar. 30, 1948 |
| 2,719,112 | Kearby et al. | Sept. 27, 1955 |
| 2,726,231 | Field et al. | Dec. 6, 1955 |
| 2,728,758 | Field et al. | Dec. 27, 1955 |
| 2,763,699 | Van Dijk et al. | Sept. 18, 1956 |
| 2,779,714 | Keith | Jan. 29, 1957 |
| 2,825,721 | Hogan et al. | Mar. 4, 1958 |
| 2,837,504 | Hanson et al | June 3, 1958 |
| 2,858,902 | Cottle | Nov. 4, 1958 |

OTHER REFERENCES

Perry: Chemical Engineers' Handbook, p. 1204, McGraw-Hill, 1950.

UNITED STATES PATENT OFFICE
CERTIFICATE OF CORRECTION

Patent No. 3,008,938                                                    November 14, 1961

Howard B. Irvin

It is hereby certified that error appears in the above numbered patent requiring correction and that the said Letters Patent should read as corrected below.

Column 6, line 66, before "condensing" insert a comma.

Signed and sealed this 3rd day of July 1962.

(SEAL)
Attest:

ERNEST W. SWIDER                                                DAVID L. LADD
Attesting Officer                                                   Commissioner of Patents